(12) United States Patent
Roe et al.

(10) Patent No.: US 9,957,887 B2
(45) Date of Patent: May 1, 2018

(54) SYSTEM FOR DETERMINING PISTON DAMAGE BASED ON CARBON DEPOSIT GROWTH

(71) Applicant: Caterpillar Inc., Peoria, IL (US)

(72) Inventors: Austin P. Roe, East Peoria, IL (US); Scott A. Thompson, Washington, IL (US); Anthony T. Petrou, Peoria, IL (US); Michael J. Campagna, Chillicothe, IL (US)

(73) Assignee: Caterpillar Inc., Peoria, IL (US)

( * ) Notice: Subject to any disclaimer, the term of this patent is extended or adjusted under 35 U.S.C. 154(b) by 103 days.

(21) Appl. No.: 15/223,869

(22) Filed: Jul. 29, 2016

(65) Prior Publication Data

US 2018/0030890 A1    Feb. 1, 2018

(51) Int. Cl.
| | |
|---|---|
| *F02B 77/04* | (2006.01) |
| *F02F 3/22* | (2006.01) |
| *G07C 5/00* | (2006.01) |
| *F02D 35/02* | (2006.01) |
| *F02B 77/08* | (2006.01) |
| *F02D 17/04* | (2006.01) |

(52) U.S. Cl.
CPC ............ *F02B 77/04* (2013.01); *F02B 77/083* (2013.01); *F02D 17/04* (2013.01); *F02D 35/02* (2013.01); *F02F 3/22* (2013.01); *G07C 5/006* (2013.01); *F02D 2200/021* (2013.01)

(58) Field of Classification Search
CPC ........ F02B 77/04; F02B 77/083; F02D 17/04; F02D 35/02; F02D 2200/021; F02F 3/22; G07C 5/006

USPC ............ 123/41.35, 639, 359, 397, 466, 686, 123/193.6; 60/619, 719; 701/32.7, 33.3; 73/114.09

See application file for complete search history.

(56) References Cited

U.S. PATENT DOCUMENTS

| | | | | |
|---|---|---|---|---|
| 4,502,422 A | * | 3/1985 | Brann | F01P 3/08 |
| | | | | 123/193.6 |
| 5,724,933 A | * | 3/1998 | Silvonen | F02F 3/0023 |
| | | | | 123/193.6 |
| 2007/0107695 A1 | * | 5/2007 | Kuo | F02B 23/0672 |
| | | | | 123/435 |
| 2010/0115721 A1 | * | 5/2010 | Gugaratshan | F02B 77/04 |
| | | | | 15/104.011 |

(Continued)

*Primary Examiner* — Lindsay Low
*Assistant Examiner* — John Bailey

(57) ABSTRACT

A machine may comprise a piston; a memory; and an electronic control module. The electronic control module may be configured to determine a temperature of a bowl rim of the piston; calculate a temperature of an oil gallery of the piston based on the temperature of the bowl rim; determine a carbon deposit growth rate of the piston based on the temperature of the oil gallery; determine an amount of time between a current time and the time when the previous carbon deposit growth was calculated; calculate a current carbon deposit growth on the piston; and take a remedial action based on the current carbon deposit growth. The current carbon deposit growth may be calculated based on: a previous carbon deposit growth on the piston, an amount of time between a current time and a time when the previous carbon deposit growth was calculated, and the carbon deposit growth rate.

20 Claims, 4 Drawing Sheets

(56) References Cited

U.S. PATENT DOCUMENTS

| | | | |
|---|---|---|---|
| 2012/0090384 A1* | 4/2012 | Altin | G01N 1/2247 |
| | | | 73/53.01 |
| 2014/0331973 A1* | 11/2014 | Matsuda | F02D 41/3094 |
| | | | 123/478 |
| 2015/0198135 A1* | 7/2015 | Martin | F02P 23/04 |
| | | | 701/22 |
| 2015/0345421 A1 | 12/2015 | Gniesmer | |
| 2016/0047284 A1* | 2/2016 | Turgeon | F01N 3/0293 |
| | | | 60/605.1 |
| 2016/0053710 A1* | 2/2016 | Donahue | F02F 1/004 |
| | | | 123/668 |
| 2016/0169187 A1* | 6/2016 | Thompson | G01M 15/11 |
| | | | 701/34.4 |
| 2017/0321625 A1* | 11/2017 | Tao | F02F 3/027 |

\* cited by examiner

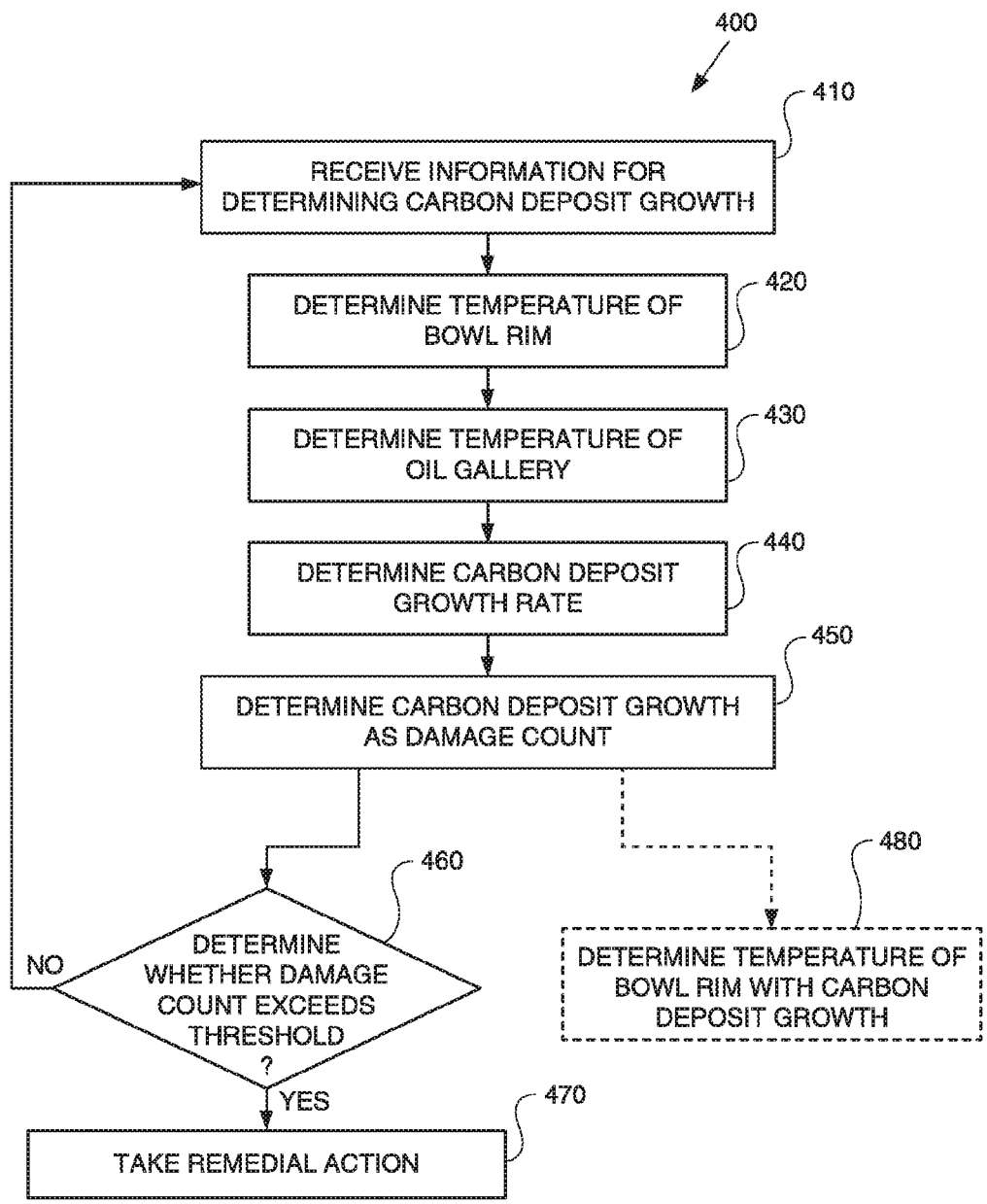

SYSTEM FOR DETERMINING PISTON DAMAGE BASED ON CARBON DEPOSIT GROWTH

TECHNICAL FIELD

The present disclosure relates generally to a system for determining piston damage and, more particularly, to a system for system for determining piston damage based on carbon deposit growth on the piston.

BACKGROUND

An internal combustion engine may include an engine block defining a plurality of cylinder bores, a crankshaft rotatably supported in the engine block, and pistons connected to the crankshaft and configured to reciprocate within the cylinder bores. Typically, each piston may include a skirt pivotally connected to the crankshaft, and a crown connected to a distal end of the skirt. A combustion bowl may be formed on an end face of the crown to receive injected fuel, and annular grooves may be formed in an outer surface of the crown to receive associated rings. A cooling passage may be annularly formed inside the crown, between the bowl and the cooling passage, to circulate engine oil that may cool the bowl.

During operation of the engine, fuel and air is combusted inside the cylinder bore (and inside the bowl), to generate heat and pressure that is turned into mechanical work. Over a period of time, carbon deposit may grow on the piston. For example, carbon deposit may grow on a bottom portion of the piston (and/or a top portion of the piston). For instance, carbon deposit may grow under the crown of the piston (and/or the crown). As the carbon deposit grows on the piston, the piston may become insulated and may be unable to reduce the temperature of the piston within a threshold amount of time. In other words, the piston may be unable to cool down within the threshold amount of time. Accordingly, as fuel and air continues to be combusted inside the cylinder bore, the temperature of the piston may continue to increase and the amount of time for the piston to cool down may increase. As a result of the increase of the temperature of the piston and the increase in the amount of time for the piston to cool down, the piston may be damaged. For example, a rim of the bowl of the piston may be damaged.

U.S. Patent Application Publication No. 20150345421 (hereinafter the '421 publication) is directed to a piston of an internal combustion engine. The piston may include a piston crown with annular grooves, a combustion chamber bowl, and a piston skirt with a pin bore to receive a pin. However, the '421 publication does not disclose monitoring carbon deposit growth on the piston.

SUMMARY

In some embodiments, a control system, for monitoring carbon deposit growth on a piston of an engine, may comprise a memory configured to store carbon deposit growth information; and an electronic control module. The electronic control module may be configured to obtain, from the carbon deposit growth information stored in the memory, information identifying a previous carbon deposit growth on the piston; obtain, from the carbon deposit growth information stored in the memory, information identifying a time when the previous carbon deposit growth was calculated; determine a temperature of a bowl rim of the piston; and calculate a temperature of an oil gallery of the piston based on the temperature of the bowl rim. The electronic control module may further be configured to determine a carbon deposit growth rate of the piston based on the temperature of the oil gallery; determine an amount of time between a current time and the time when the previous carbon deposit growth was calculated; calculate a current carbon deposit growth on the piston based on the previous carbon deposit growth, the amount of time, and the carbon deposit growth rate; and take a remedial action based on the current carbon deposit growth.

In some embodiments, a method, for monitoring carbon deposit growth on a piston of an engine, may comprise obtaining, by an electronic control module and from carbon deposit growth information stored in a memory, information identifying a previous carbon deposit growth on the piston; obtaining, by the electronic control module and from the carbon deposit growth information stored in the memory, information identifying a time when the previous carbon deposit growth was calculated; determining, by the electronic control module and a temperature of a bowl rim of the piston; calculating, by the electronic control module, a temperature of an oil gallery of the piston based on the temperature of the bowl rim; and determining, by the electronic control module, a carbon deposit growth rate of the piston based on the temperature of the oil gallery. The method may also comprise determining, by the electronic control module an amount of time between a current time and the time when the previous carbon deposit growth was calculated; calculating, by the electronic control module, a current carbon deposit growth the piston based on the previous carbon deposit growth, the amount of time, and the carbon deposit growth rate; and taking, by the electronic control module, a remedial action based on the current carbon deposit growth.

In some embodiments, a machine may comprise a piston; a memory configured to store carbon deposit growth information; and an electronic control module. The carbon deposit growth information may include information identifying a previous carbon deposit growth on the piston. The electronic control module may be configured to: determine a temperature of a bowl rim of the piston; calculate a temperature of an oil gallery of the piston based on the temperature of the bowl rim; determine a carbon deposit growth rate of the piston based on the temperature of the oil gallery; and determine an amount of time between a current time and the time when the previous carbon deposit growth was calculated. The electronic control module may further be configured to calculate a current carbon deposit growth on the piston based on: the previous carbon deposit growth, an amount of time between a current time and a time when the previous carbon deposit growth was calculated, and the carbon deposit growth rate; and take a remedial action based on the current carbon deposit growth.

BRIEF DESCRIPTION OF THE DRAWINGS

FIG. 4 is a flow chart of an example process performed by the system of FIG. 3 for monitoring and determining an amount of carbon deposit growth on the piston of FIG. 2 to determine damage to the piston.

DETAILED DESCRIPTION

Figure 1:
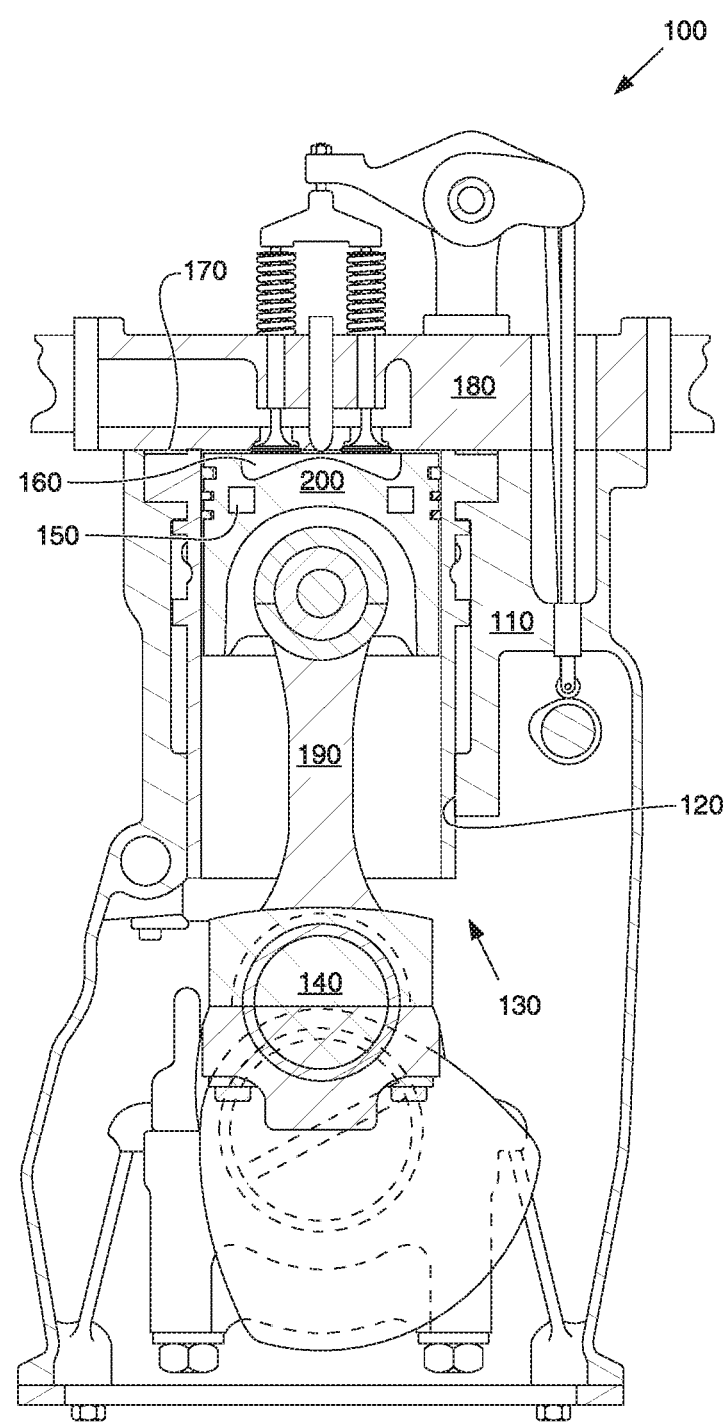
FIG. 1 is a cross-sectional view of an engine according to an embodiment of the present disclosure.

FIG. 1 is a cross-sectional view of an exemplary internal combustion engine 100 (or engine 100) according to an embodiment of the present disclosure. In some implementations, engine 100 may include a block 110 (or engine block 110) defining one or more bores 120 (or cylinder bores 12). A hollow liner 130 (or cylinder liner 130) may be disposed within each of the one or more bores 120, and a head 180 (or cylinder head 180) may be connected (e.g., by way of a gasket 170) to block 110 to close off an end of a bore 120, of the one or more bores 120, and liner 130. A piston 200 may be slidably disposed within liner 130, and piston 200 together with liner 130 and head 180 may define a combustion chamber 160. Piston 200 may include an annular cooling passage 150. Piston 200 and annular cooling passage 150 are described in more detailed below. In some implementations, engine 100 may include one or more combustion chambers 160 and the one or more combustion chambers 160 may be disposed in an "in-line" configuration, in a "V" configuration, in an opposing-piston configuration, or in any other suitable configuration.

In some implementations, piston 200 may be configured to reciprocate within liner 130 between a top-dead-center (TDC) position and a bottom-dead-center (BDC) position during a combustion event occurring with chamber 160. More particularly, piston 200 may be pivotally connected to a crankshaft 140 by way of a connecting rod 190 (or rod 190), so that a sliding motion of each piston 200 within cylinder liner 130 results in a rotation of crankshaft 140. Similarly, a rotation of crankshaft 140 may result in a sliding motion of piston 200. In a four-stroke engine, piston 200 may move through four full strokes to complete a combustion cycle of about 720° of crankshaft rotation. These four strokes include an intake stroke (TDC to BDC), a compression stroke (BDC to TDC), a power stroke (TDC to BDC), and an exhaust stroke (BDC to TDC). Fuel (e.g., diesel fuel, gasoline, gaseous fuel, etc.) may be injected into combustion chamber 160 during the intake stroke. The fuel may be mixed with air and ignited during the compression stroke. Heat and pressure resulting from the fuel/air ignition may then be converted to useful mechanical power during the ensuing power stroke. Residual gases may be discharged from combustion chamber 160 during the exhaust stroke.

The number of components (of engine 100) shown in FIG. 1 is provided for explanatory purposes. In practice, there may additional components, fewer components, different components, or differently arranged components than those shown in FIG. 1.

Figure 2:
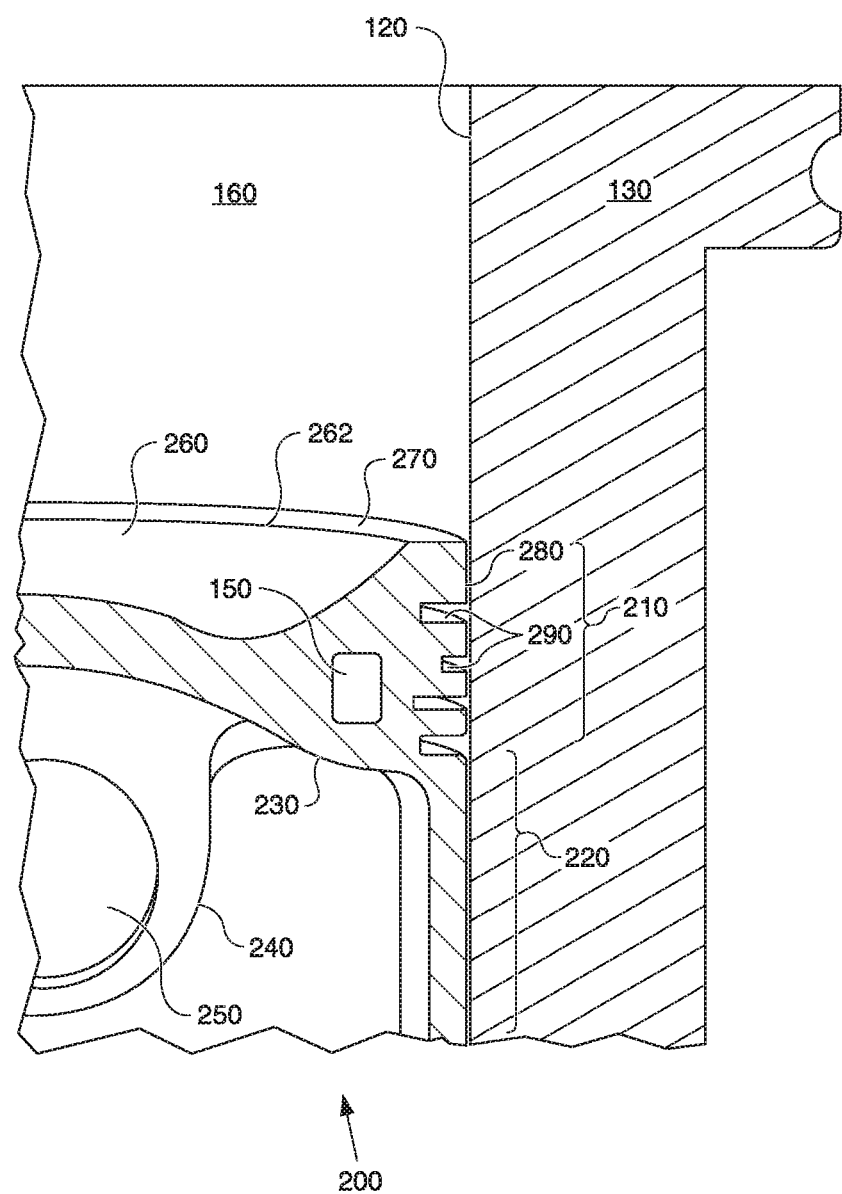
FIG. 2 is a cross-sectional view of a piston of the engine of FIG. 1.

FIG. 2 is a cross-sectional view of piston 200 of engine 100 of FIG. 1. In some implementations, piston 200 may generally consist of an integral crown 210 (or crown 210), a skirt 220, and undercrown 230. Skirt 220 be generally tubular (i.e., hollow and cylindrical), with a bearing support 240 (or support 240) formed therein. Support 240 may be configured to receive a wrist pin that pivotally connects piston 200 to rod 190 (referring to FIG. 1). Support 240 may define a piston pin bore 250. Crown 210 may be formed at end of piston 200 opposite support 240, and may include an end face 270 and an annular side surface 280. Undercrown 230 may correspond to an area under crown 210. One or more ring grooves 290 may be cut into annular side surface 280 and configured to receive corresponding oil rings (not shown), compression rings (not shown), or another type of piston ring known in the art. A bowl 260 may be recessed within end face 270, and a rim 262 (bowl rim 262) may be located at an intersection of bowl 260 and end face 270. An annular cooling passage 150 may be formed in crown 210 between bowl 260 and grooves 290. The circulation of engine oil or another coolant through passage 150 during operation of engine 100 may reduce a temperature of crown 210. In some implementations, annular cooling passage 150 may define (or may correspond to) an oil gallery in which the engine oil may reside. With this configuration, the engine oil may function as a heat sink, causing combustion heat from inside bowl 260 to pass radially outward and downward in a direction toward annular cooling passage 150.

The number of components shown in FIG. 2 is provided for explanatory purposes. In practice, there may additional components, fewer components, different components, or differently arranged components than those shown in FIG. 2.

Figure 3:
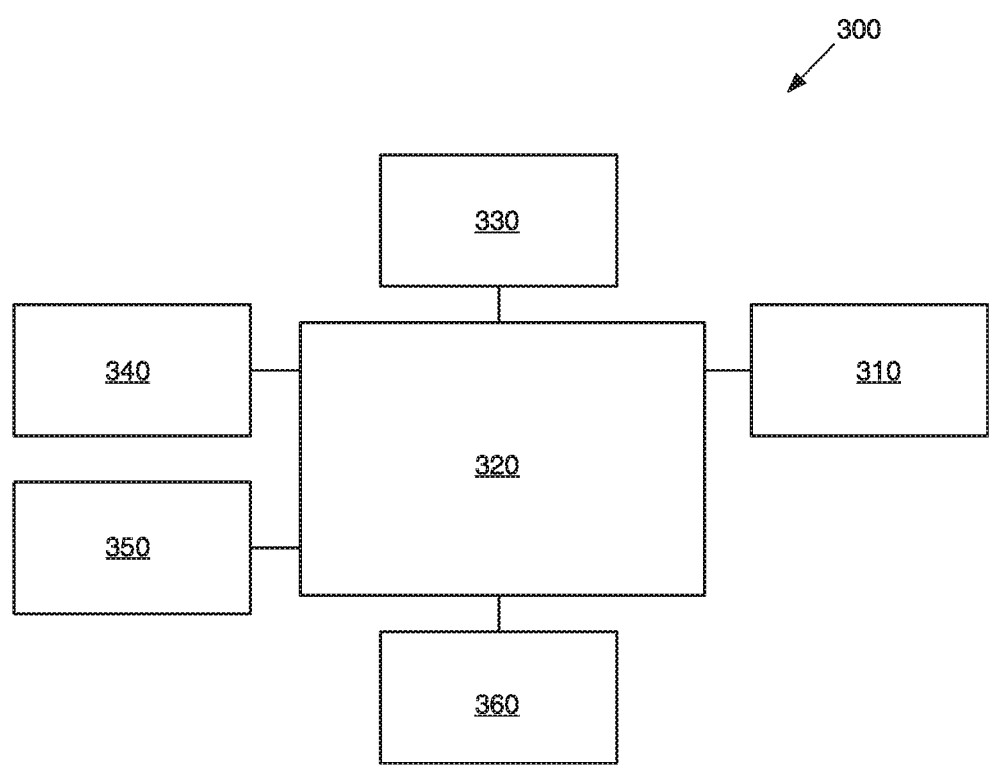
FIG. 3 is a diagram of example components of a system that may be used to monitor and determine an amount of carbon deposit growth on the piston of FIG. 2 to determine damage to the piston.

FIG. 3 is a diagram of example components of a system 300 that may be used to monitor and determine an amount of carbon deposit growth on piston 200 of FIG. 2 to determine damage to piston 200. In some embodiments, the example components may include a memory 310, an electronic control module (ECM) 320, a display 330, a sensor 340, an input device 350, and a communication interface 360. The example components of system 300 may be implemented using hardware, software, and/or a combination of hardware and software. In some implementations, the example components of system 300 may be interconnected using wired connections, wireless connections, and/or a combination of wired connections and wireless connections.

In some implementations, engine 100 and one or more of the example components of system 300 may be included in a machine. For example, engine 100, memory 310, ECM 320, display 330, sensor 340, input device 350 and/or communication interface 360 may be located in the machine. In some implementations, one or more of the example components of system 300 may be included in a back office. For example, memory 310, ECM 320, display 330, sensor 340, input device 350 and/or communication interface 360 may be located in the back office while engine 100 and sensor 340 may be located in the machine.

Memory 310 may include a random access memory ("RAM"), a read only memory ("ROM"), and/or another type of dynamic or static storage device (e.g., a flash, magnetic, or optical memory) that stores information and/or instructions for use by the example components, such as ECM 320. Additionally, or alternatively, memory 310 may include non-transitory computer-readable medium or memory, such as a disc drive, flash drive, optical memory, read-only memory (ROM), or the like. In some implementations, with respect to the information and/or the instructions for use by the example components, memory 310 may store information (e.g., obtained in real-time or near real-time by sensor 340) regarding temperature(s) of engine 100, temperature(s) of piston 200, temperature(s) of components of piston 200 (e.g., temperature(s) of crown 210, rim 262, undercrown 230, etc.). Additionally, or alternatively, memory 310 may store information regarding one or more models as described in U.S. patent application Ser. No. 15/087,439 (incorporated herein by reference in its entirety). For example, the one or more models may include a combustion model, a heat flux model, a thermal model, and/or a damage model. In some implementations, memory 310 may store the information and/or the instructions in one or more data structures, such as one or more databases, tables, lists, trees, etc.

ECM 320 (or controller 320) may include any type of device or any type of component that may interpret and/or execute the information and/or the instructions stored within memory 310 to perform one or more functions. For example, ECM 320 may use the information and/or execute the instructions to monitor and determine an amount of carbon deposit growth on piston 200 to determine damage to piston 200. In some implementations, ECM 320 may include a processor (e.g., a central processing unit, a graphics processing unit, an accelerated processing unit), a microprocessor, and/or any processing logic (e.g., a field-programmable gate array ("FPGA"), an application-specific integrated circuit ("ASIC"), etc.), and/or any other hardware and/or software.

In some embodiments, ECM 320 may obtain information from the example components and use the information to monitor and determine an amount of carbon deposit growth on piston 200 to determine damage to piston 200. For example, ECM 320 may obtain information from sensor 340 and/or from memory 310 and use the information to determine an amount of carbon deposit growth on piston 200 to determine damage to piston 200. In some implementations, ECM 320 may transmit, via a network (not shown), information regarding the amount of carbon deposit growth and/or information regarding the damage to piston 200 to another device (e.g., at a back office system (not shown)) and/or another machine (not shown)). For example, ECM 320 may cause communication interface 360 to transmit the information regarding the amount of carbon deposit growth and/or the information regarding the damage to piston 200.

Display 330 may include any type of device or any type of component that may display information. For example, display 330 may display information regarding the amount of carbon deposit growth and/or information regarding the damage to piston 200. In some implementations, display 330 may be a liquid crystal display (LCD), a light-emitting diode (LED) display, an organic light-emitting diode (OLED) display, and/or the like.

Sensor 340 may include any type of device(s) or any type of component(s) that may sense (or detect) information regarding engine 100 and/or piston 200. In some implementations, sensor 340 may located at various portions of engine 100 and/or piston 200 to sense (or detect) information regarding engine 100 and/or piston 200. For example, the information regarding engine 100 may include a speed of engine 10 (e.g., a rotational speed of crankshaft 140), a quantity of fuel being injected into combustion chamber 160 during each combustion cycle, a timing of the fuel being injected, a pressure of the fuel being injected, a flow rate of air entering combustion chamber 160 during each combustion cycle, a temperature of the air, a pressure of the air, a temperature of the engine oil in passage 150 (e.g., the oil gallery) and/or other fluid of engine 100, a temperature of other components of engine 100 and/or piston 200 (e.g., crown 210, rim 262, etc.), a cylinder pressure, and/or the like. In some implementations, sensor 340 may include a pressure sensor (e.g., to detect machine strut pressures), a force gauge, a load cell, a piezoelectric sensor, and/or the like.

Input device 350 may include a component that permits a user to input information to one or more other components of the example components of system 300. For example, the information, input by the user, may include a preference (of the user) for a frequency for monitoring and/or determining the amount of carbon deposit growth and the damage to piston 200. Additionally, or alternatively, the information, input by the user, may include a manner (e.g., algorithm(s), parameters(s), etc.) for monitoring and/or determining the amount of carbon deposit growth and/or the damage to piston 200. In some embodiments, input device 360 may include a keyboard, a keypad, a mouse, a button, a camera, a microphone, a switch, a touch screen display, and/or the like.

Communication interface 360 may include a transceiver-like component, such as a transceiver and/or a separate receiver and transmitter that enables device 300 to communicate with other devices, such as via a wired connection, a wireless connection, or a combination of wired and wireless connections. For example, communication interface 360 may include an Ethernet interface, an optical interface, a coaxial interface, an infrared interface, a radio frequency ("RF") interface, a universal serial bus ("USB") interface, or the like.

The number of components shown in FIG. 3 is provided for explanatory purposes. In practice, there may additional components, fewer components, different components, or differently arranged components than those shown in FIG. 3.

FIG. 4 is a flow chart of an example process 400 performed by the system of FIG. 3 for monitoring and determining an amount of carbon deposit growth on piston 200 to determine damage to the piston. In some implementations, one or more process blocks of process 400 may be performed by ECM 320. For example, ECM 320 may perform one or more process blocks of process 400 automatically (e.g., without intervention/input from a user). In some implementations, one or more process blocks of FIG. 4 may be performed by another device or a group of devices separate from or including ECM 320, such as device(s) at a remote location (e.g., a back office).

As shown in FIG. 4, process 400 may include receiving information for determining carbon deposit growth (block 410). For example, ECM 320 may receive carbon deposit growth information that ECM 320 may use with respect to determining carbon deposit growth on piston 200. In some implementations, the carbon deposit growth information may be stored in memory 310 and ECM 320 may obtain the carbon deposit growth information from memory 310. Additionally, or alternatively, the carbon deposit growth information may be stored in another memory (similar to or different than memory 310) and ECM 320 may obtain the carbon deposit growth information from memory 310. Additionally, or alternatively, the carbon deposit growth information may be submitted by a user using input device 350 and ECM 320 may receive the carbon deposit growth information submitted by the user. Additionally, or alternatively, the carbon deposit growth information may be obtained by sensor 340 and ECM 320 may obtain the carbon deposit growth information from sensor 340.

In some implementations, the carbon deposit growth information may include an indication that carbon deposit growth is to be determined for piston 200. For example, the indication may submitted by a user using input device 350 and ECM 320 may receive the indication. Additionally, or alternatively, ECM 320 may obtain information from memory 310 and may identify the indication based on the information obtained from memory 310. In some implementations, the information from memory 310 may include a time interval for ECM 320 to determine carbon deposit growth. For example, the time interval may indicate that ECM 320 is to determine carbon deposit growth at a frequency 0.01 Hz to 100 Hz. The time interval may be expressed in other units of time measurement. For example, the time interval may indicate that ECM 320 is to determine carbon deposit growth every second, every minute, every hour, and/or the like.

Additionally, or alternatively, the carbon deposit growth information may include piston and/or engine information regarding the components of piston 200 and/or the components of engine 100. For example, the piston and/or engine information may include physical parameters (e.g., geometry, shapes, sizes, contours, material properties such as coefficients of heat transfer, etc.) of the components, relationships (e.g., a compression ratio, a bore stroke, valve timings, etc.) between the components, and/or the like. Additionally, or alternatively, the piston and/or engine information may include information regarding various fluids (fuel, lubrication, coolant, engine oil, air, etc.) of piston 200 and/or engine 100. For example, the information regarding various fluids may include a makeup of the fluids, a concentration of the fluids, a quality of the fluids, other characteristics of the fluids, and/or the like.

Additionally, or alternatively, the carbon deposit growth information may include the information regarding one or more of the models (a combustion model, a heat flux model, a thermal model, and/or a damage model) as described in U.S. patent application Ser. No. 15/087,439 (incorporated herein by reference in its entirety). Additionally, or alternatively, the carbon deposit growth information may include the information regarding engine 100 and/or piston 200 described above with respect to sensor 340.

As further show in FIG. 4, process 400 may include determining a temperature of a bowl rim (block 420). For example, ECM 320 may determine a temperature of bowl rim 262 of piston 200 based on the carbon deposit growth information. In some implementations, ECM 320 may determine the temperature of bowl rim 262 in a manner similar to that described in U.S. patent application Ser. No. 15/087, 439 (incorporated herein by reference in its entirety). For example, ECM 320 may determine the temperature of bowl rim 262 (along with the temperature of crown 210) using the thermal model (included in the carbon deposit growth information) in a manner similar to that described in U.S. patent application Ser. No. 15/087,439 (incorporated herein by reference in its entirety).

As further show in FIG. 4, process 400 may include determining a temperature of an oil gallery (block 430). For example, ECM 320 may calculate the temperature of the oil gallery (defined by annular passage 150) based on the temperature of bowl rim 262 (determined in block 420) and one or more additional factors, such as a temperature offset. In some implementations, ECM 320 may determine a relationship between temperatures of bowl rim and temperature offsets. In some implementations, the relationship between the temperatures of bowl rim and the temperature offsets may be based on one or more analyses, such as one or more finite element analyses. For example, results of the analysis may identify a corresponding temperature offset for each temperature of a bowl rim. For instance, the results of the analysis may be illustrated as a graph (or a chart) that a corresponding temperature offset for each temperature of a bowl rim. Accordingly, based on the temperature of bowl rim 262 and using the relationship between the temperatures of bowl rim and the temperature offsets, ECM 320 may determine the temperature offset corresponding to the temperature of bowl rim 262.

In some implementations, ECM 320 may calculate the temperature of the oil gallery as a mathematical combination of the temperature of bowl rim 262 and the temperature offset. For example, ECM 320 may calculate the temperature of the oil gallery as an addition of the temperature of bowl rim 262 and the temperature offset. For instance, ECM 320 may calculate the temperature of the oil gallery using the following equation:

$$T_{OG} = T_{BR} + T_{Offset} \qquad \text{EQ. 1}$$

wherein:
$T_{OG}$ is the temperature of the oil gallery,
$T_{BR}$ is the temperature of bowl rim 262, and
$T_{Offset}$ is the temperature offset.

In some implementations, information identifying the relationship between the temperatures of bowl rim and the temperature offsets may be included in the carbon deposit growth information. In some implementations, ECM 320 may cause the information identifying the relationship between the temperatures of bowl rim and the temperature offsets to be updated (e.g., based on additional experiments, field studies, analyses, and/or the like.

As further show in FIG. 4, process 400 may include determining a carbon deposit growth rate (block 440). For example, ECM 320 may determine the carbon deposit growth rate (or a rate at which the carbon thickness changes) on piston 200 (e.g., crown 210 and/or undercrown 230) based on the temperature of the oil gallery (determined in block 430). In some implementations, ECM 320 may determine a relationship between temperatures of oil galleries and carbon growth rates. In some implementations, the relationship between the temperatures of oil galleries and the carbon growth rates may be based on one or more experiments, field studies, analyses, and/or the like. For example, results of the one or more experiments, field studies, analyses may identify a threshold temperature of oil gallery at which (and/or after which) carbon growth begins and may identify a corresponding carbon growth rate for each temperature of oil gallery meeting or exceeding the threshold temperature of oil gallery. In this regard, carbon growth may be based on a movement and/or a flow of oil in an oil gallery (the movement and/or the flow being based on a piston). Accordingly, in the movement and/or the flow of oil does not exceed a threshold movement and/or flow, carbon growth may begin.

In some implementations, the results may be illustrated as a graph (or a chart) that identifies a corresponding carbon growth rate for each temperature of oil gallery. Accordingly, based on the temperature of the oil gallery and using the relationship between the temperatures of oil galleries and the carbon growth rates, ECM 320 may determine the carbon growth rate ($\dot{C}$) corresponding to the temperature of the oil gallery. In some implementations, the carbon growth rate may be measured (or expressed) in micro meters per hour ($\mu m/h$). Additionally, or alternatively, other units of measurement may be used to measure (or express) the carbon growth rate. In some implementations, the carbon growth rate may vary based on a type of carbon.

In some implementations, information identifying the relationship between the temperatures of oil galleries and the carbon growth rates may be included in the carbon deposit growth information. In some implementations, ECM 320 may cause the information identifying the relationship between the temperatures of oil galleries and the carbon growth rates to be updated (e.g., based on additional experiments, field studies, analyses, and/or the like).

As further show in FIG. 4, process 400 may include determining the carbon deposit growth as a damage count (block 450). For example, ECM 320 may calculate the carbon deposit growth (or carbon thickness or carbon layer thickness) on piston 200 (e.g., on crown 210 and/or undercrown 230) based on the carbon growth rate (determined in block 440). In some implementations, ECM 320 may calculate the carbon deposit growth based on a mathematical combination of the carbon growth rate and one or more other factors. For example, ECM 320 may calculate the carbon deposit growth using the following equation:

$$X_c(i) = X_c(i-1) + \dot{C} * \Delta t \qquad \text{EQ. 2}$$

wherein:
i is the current iteration (of the calculation of the carbon deposit growth),
$X_c(i)$ is the carbon deposit growth (or the current carbon deposit growth),
$X_c(i-1)$ is the previous carbon deposit growth, and
$\Delta t$ is the amount of time between a current time and a time (prior to the current time) when the previous carbon deposit growth was calculated ($\Delta t$ may be based on or correspond to the time interval for ECM 320 to determine carbon deposit growth).

In some implementations, the previous carbon deposit growth may refer to an amount of carbon deposit that has been accumulated on piston 200 up until the time (prior to the current time) when the previous carbon deposit growth was calculated. In this regard, the carbon deposit growth (or the current carbon deposit growth) may refer to an additional amount of carbon deposit or an amount of carbon deposit that has been accumulated on piston 200 up until the current time. In some implementations, information identifying the previous carbon deposit growth and information identifying the time when the previous carbon deposit growth was calculated may be included in the carbon deposit growth information. In this regard, ECM 320 may determine the current time as a time to calculate the carbon deposit growth based on the time interval and the time when the previous carbon deposit growth was calculated. For example, ECM 320 may determine that the time interval has elapsed since the time when the previous carbon deposit growth was calculated and, accordingly, determine that the carbon deposit growth is to be calculated at the current time. Additionally, or alternatively, ECM 320 may determine $\Delta t$ based on the time interval and the time when the previous carbon deposit growth was calculated. Additionally, or alternatively, ECM 320 may determine $\Delta t$ based on the current time and the time when the previous carbon deposit growth was calculated.

In some implementations, the carbon deposit growth may be measured (or expressed) in micro meters (nm). Additionally, or alternatively, other units of measurement may be used to measure (or express) the carbon deposit growth. In some implementations, ECM 320 may update the carbon deposit growth information based on the carbon deposit growth (or the current carbon deposit growth). For example, ECM 320 may update the previous carbon deposit growth with the current carbon deposit growth. Accordingly, the current carbon deposit growth, included in the carbon deposit growth information (stored in memory 310 and/or another memory), may become the previous carbon deposit growth.

In some implementations, the various equations and associated elements, described herein, to determine the carbon deposit growth may form a carbon growth model. In this regard, the various equations are provided as example equations. In some implementations, the associated elements (and/or additional elements) may be used in different mathematical combinations and/or different equations to determine the carbon deposit growth. In some implementations, the carbon growth model may be included in the carbon deposit growth information.

As further show in FIG. 4, process 400 may include determining whether the damage count exceeds a threshold (block 460). For example, ECM 320 may determine whether the carbon deposit growth (determined in block 450) exceeds a threshold carbon deposit growth. (or a threshold carbon thickness). In some implementations, the threshold carbon deposit growth may correspond to a carbon deposit growth (or carbon thickness) that causes an increase (or a start of increase) in a temperature of piston 200 and an increase (or a start of increase) in an amount of time for piston 200 to cool down, which ultimately causes piston 200 to be damaged, to start experiencing damage, or causes damage to piston 200 to be accelerated. For example, the threshold carbon deposit growth may correspond to a carbon deposit growth (or carbon thickness/carbon layer thickness) that causes an increase (or a start of increase) in the temperature of bow rim 262 and an increase (or a start of increase) in an amount of time for bowl rim 262 to cool down, which ultimately causes bowl rim 262 to start experiencing damage, to be damaged, to experience accelerated damage. In some implementations, the threshold carbon deposit growth may be included in the carbon deposit growth information.

As further shown in FIG. 4, if the damage count exceeds the threshold (block 460—YES), then process 400 may include taking a remedial action (block 470). For example, if ECM 320 determines that the carbon deposit growth (determined in block 450) exceeds the threshold carbon deposit growth, ECM 320 may take a remedial action. In some implementations, the remedial action may include causing information to be displayed via display 330. For example, the information may indicate that the carbon deposit growth has exceeded the carbon deposit growth threshold and that piston 200 may be damaged and/or may fail if piston 200 continues to be used (or, in other words, if piston 200 is not replaced or serviced). Additionally, or alternatively, the information may indicate that engine 100 is to be shut down or derated to prevent additional carbon growth deposit, that engine 100 is to be serviced, that piston 200 is to be replaced or serviced, and/or the like. Additionally, or alternatively, the information may include instructions for servicing engine 100, instructions for servicing piston 200 (e.g., replacing and/or repairing piston 200), information identifying piston 200 and a location of piston 200 within engine 100 (for example, if engine 100 includes multiple pistons), and/or the like. In some implementations, the information may be transmitted to a remote location (e.g., a back office system) and/or another device. For example, ECM 320 may cause the information to be transmitted to the remote location and/or the other machine. In some implementations, the information may enable characteristics/attributes of a similar piston (e.g, properties, geometry, shape, etc.) to be modified during manufacture so as to reduce a growth rate of carbon deposit during similar operating conditions.

Additionally, or alternatively, the remedial action may include causing service instructions to be provided. Additionally, or alternatively, the remedial action may include causing service of engine 100 and/or piston 200 to be automatically scheduled. Additionally, or alternatively, the remedial action may include may modify an operation of engine 100. For example, ECM 320 may cause engine 100 to slow down, decelerate, and/or be shut down to prevent additional damage to piston 200.

In some implementations, each remedial action described above may associated with a respective amount of carbon deposit growth (with each amount of carbon deposit growth corresponding to a respective level of severity of damage to piston 200). Accordingly, ECM 320 may select a remedial action based on an amount of carbon deposit growth.

As further shown in FIG. 4, if the damage count does not exceed the threshold (block 460—NO), then process 400 may return to block 410. In some implementations, if the damage count does not exceed the threshold (block 460—NO), then process 400 may return to any one of block 410, block 420, block 430, block 440, or block 450.

As further show in FIG. 4, process 400 may include determining a temperature of the bowl rim with carbon deposit growth (block 480). For example, ECM 320 may calculate a temperature of bowl rim 262 with the carbon growth deposit (determined at block 450) based on the temperature of bowl rim 262 (determined in block 420) and one or more additional factors, such as a carbon temperature offset. In some implementations, ECM 320 may determine a relationship between carbon deposit growth and carbon temperature offsets. In some implementations, the relationship between the carbon deposit growth and the carbon temperature offsets may be based on one or more analyses, experiments, field study, and/or the like. For example, results of the one or more analyses, experiments, field study, and/or the like may identify a corresponding carbon temperature offset for each carbon deposit growth. For instance, the results may be illustrated as a graph (or a chart) that identifies a corresponding carbon temperature offset for each carbon deposit growth. Accordingly, based on the current carbon deposit growth (determined at block 450) and using the relationship between the carbon deposit growth and the carbon temperature offsets, ECM 320 may determine the carbon temperature offset corresponding to the current carbon deposit growth.

In some implementations, ECM 320 may calculate the temperature of bowl rim 262 with the carbon growth deposit as a mathematical combination of the temperature of bowl rim 262 and the carbon temperature offset. For example, ECM 320 may calculate the temperature of bowl rim 262 with the carbon growth deposit as an addition of the temperature of bowl rim 262 and the carbon temperature offset. For instance, ECM 320 may calculate the temperature of bowl rim 262 with the carbon growth deposit using the following equation:

$$T_{BRC} = T_{BR} + T_{cOffset} \qquad \text{EQ. 3}$$

wherein:

$T_{BRC}$ s the temperature of bowl rim 262 with the carbon growth deposit, $T_{BR}$ is the temperature of bowl rim 262, and $T_{cOffset}$ is the carbon temperature offset.

In some implementations, information identifying the relationship between the carbon deposit growth and the carbon temperature offsets may be included in the carbon deposit growth information. In some implementations, ECM 320 may cause the information identifying the relationship between the carbon deposit growth and the carbon temperature offsets to be updated (e.g., based on additional experiments, field studies, analyses, and/or the like).

INDUSTRIAL APPLICABILITY

The disclosed system may be used in any application where an increase in reliability of an engine and components of an engine is desire. The disclosed system may increase engine reliability by monitoring an amount of carbon deposit growth on an a piston and taking a remedial action when the amount of carbon deposit growth exceeds a threshold that causes the piston to be damaged. In some implementations, ECM 320 may determine the temperature of bowl rim 262, the temperature of the oil gallery, the carbon deposit growth rate, and/or the carbon deposit growth in real-time or near real-time. In some implementations, ECM 320 may predict a time (e.g., date and/or time) when engine 100 and/or piston 200 may begin experiencing damage and/or when engine 100 and/or piston 200 may begin experience a failure based on one or more factors (e.g., the temperature of bowl rim 262, the temperature of the oil gallery, the carbon deposit growth rate, the time interval for ECM 320 to determine carbon deposit growth, the previous carbon deposit growth, other information include in the carbon deposit growth information, the current carbon deposit growth, and/or the like). In this regard, as part of taking the remedial action, ECM 320 may cause information regarding the prediction to be displayed via display 330, information indicating that engine 100 and/or piston 200 are to be serviced and/or replaced at or before the predicted time to be displayed via display 330, may cause engine 100 and/or piston 200 to bell, cause a service of engine 100 and/or piston 200 to be scheduled, and/or the like.

The disclosed system may have broad applicability. In particular, the system may be applicable to any type and design of piston 200, and may be useful during design and/or selection of piston 200 prior to use of piston 200 within engine 100. For example, information associated with and performance parameters measured from an existing engine may be used by ECM 320 to simulate carbon deposit growth on an engine and components of the engine. The results of the simulation may then be used to design and/or select application-specific pistons. In addition, the system may provide information regarding the damage count of piston 200, and the information may remain accurate as engine 100 wears (as the carbon deposit growth information is updated based on wear conditions). In addition, the system may be useful across multiple configurations or platforms of engines.

The disclosed concepts can be used during development of the engine components based on historic engine data, as desired. In particular, the disclosed concepts can be used to determine the status of the engine components given particular operating conditions. For example, based on a calculated damage count calculated for the engine components when exposed to the particular operating conditions, properties and/or geometry of the engine components can be changed so as to reduce the damage count for the same components exposed to the same operating conditions.

It will be apparent to those skilled in the art that various modifications and variations can be made to the disclosed system. Other embodiments will be apparent to those skilled in the art from consideration of the specification and practice of the disclosed system. For example, it may be possible for engine 100 to not have cylinder liner 130, if desired, and for piston 200 to reciprocate directly within cylinder bores 120. Additionally, one or more of the parameters (e.g., temperature of oil gallery, carbon growth, etc.) used to determine the carbon deposit growth may vary based on one or more factors relating to piston and/or engine 100, such as operating conditions, properties, shapes, sizes, contours, geometry, and/or the like. It is intended that the specification and examples be considered as exemplary only, with a true scope being indicated by the following claims and their equivalents. Additionally, one or more additional parameters (e.g., a type of oil, a time interval of oil change, and/or the like) may be used to determine the carbon deposit growth.

No element, act, or instruction used herein should be construed as critical or essential unless explicitly described as such. While the present disclosure has been referring to tracking carbon deposit on a piston of an engine, one skilled in the art would appreciate that the present disclosure similarly applies to tracking carbon deposit on one or more other engine components (including one or more of the engine components of engine 100 described above). In this regard, any reference to engine 100 may refer to engine 100 as a whole and/or one or more components of engine 100. Similarly, any reference to piston 200 may refer to piston 200 as a whole and/or one or more components of piston 200. Also, as used herein, the articles "a" and "an" are intended to include one or more items, and may be used interchangeably with "one or more." Furthermore, as used herein, the term "set" is intended to include one or more items, and may be used interchangeably with "one or more." Moreover, as used herein and explained above, the term "growth" is intended to be used interchangeably with "thickness." Accordingly, "growth rate" may be used to refer to a rate at which the thickness changes. Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A control system for monitoring carbon deposit growth on a piston of an engine, the control system comprising:
    a memory configured to store carbon deposit growth information; and
    an electronic control module configured to:
        obtain, from the carbon deposit growth information stored in the memory, information identifying a previous carbon deposit growth on the piston;
        obtain, from the carbon deposit growth information stored in the memory, information identifying a time when the previous carbon deposit growth was calculated;
        determine a temperature of a bowl rim of the piston;
        calculate a temperature of an oil gallery of the piston based on the temperature of the bowl rim;
        determine a carbon deposit growth rate of the piston based on the temperature of the oil gallery;
        determine an amount of time between a current time and the time when the previous carbon deposit growth was calculated;
        calculate a current carbon deposit growth on the piston based on the previous carbon deposit growth, the amount of time, and the carbon deposit growth rate; and
        take a remedial action based on the current carbon deposit growth.

2. The control system of claim 1, wherein the electronic control module is further configured to determine whether the current carbon deposit growth exceeds a carbon deposit growth threshold, and
    wherein, when the current carbon deposit growth exceeds the carbon deposit growth threshold, the piston is to start experiencing damage.

3. The control system of claim 2, wherein the electronic control module is configured to take the remedial action when the current carbon deposit growth exceeds the carbon deposit growth threshold.

4. The control system of claim 1, wherein the electronic control module is configured to calculate the temperature of the oil gallery of the piston based on the temperature of the bowl rim and a temperature offset.

5. The control system of claim 1, wherein the current carbon deposit growth is a carbon thickness or a current carbon layer thickness on at least one of a crown of the piston or an undercrown of the piston.

6. The control system of claim 1, further comprising a display,
    wherein, when taking the remedial action, the electronic control module is configured to cause information to be displayed via the display, and
    wherein the information, displayed to the user, includes:
        information indicating that the current carbon deposit growth has exceeded the carbon deposit growth threshold and that the piston is to be damaged or is to fail if the piston continues to be used.

7. The control system of claim 1, wherein, when taking the remedial action, the electronic control module is configured to cause information to be displayed to a user,
    wherein the information, displayed to the user, includes at least one of:
        information indicating that the engine is to be shut down or derated to prevent additional carbon growth deposit,
        information indicating that the engine 100 is to be serviced, or
        information indicating that the piston is to be serviced of replaced.

8. The control system of claim 1, wherein, when taking the remedial action, the electronic control module is configured to modify the operation of the engine.

9. The control system of claim 1, wherein, when taking the remedial action, wherein, when modifying the operation of the engine, the electronic control module is configured to at least one of:
    cause the engine to decelerate, or
    cause the engine to shut down.

10. A method for monitoring carbon deposit growth on a piston of an engine, the method comprising:
    obtaining, by an electronic control module and from carbon deposit growth information stored in a memory, information identifying a previous carbon deposit growth on the piston;
    obtaining, by the electronic control module and from the carbon deposit growth information stored in the memory, information identifying a time when the previous carbon deposit growth was calculated;
    determining, by the electronic control module, a temperature of a bowl rim of the piston;
    calculating, by the electronic control module, a temperature of an oil gallery of the piston based on the temperature of the bowl rim;
    determining, by the electronic control module, a carbon deposit growth rate of the piston based on the temperature of the oil gallery;
    determining, by the electronic control module, an amount of time between a current time and the time when the previous carbon deposit growth was calculated;
    calculating, by the electronic control module, a current carbon deposit growth the piston based on the previous carbon deposit growth, the amount of time, and the carbon deposit growth rate; and
    taking, by the electronic control module, a remedial action based on the current carbon deposit growth.

11. The method of claim 10, further comprising determine whether the current carbon deposit growth exceeds a carbon deposit growth threshold,
    wherein, when the current carbon deposit growth exceeds the carbon deposit growth threshold, the piston is to start experiencing damage.

12. The method of claim 11, further comprising taking the remedial action when the current carbon deposit growth exceeds the carbon deposit growth threshold.

13. The method of claim 10, further comprising calculating the temperature of the oil gallery of the piston based on the temperature of the bowl rim and a temperature offset.

14. The method of claim 10, wherein the current carbon deposit growth is a carbon thickness or a current carbon layer thickness on at least one of a crown of the piston or an undercrown of the piston.

15. The method of claim 10, wherein taking the remedial action includes causing information to be displayed to a user,
    wherein the information, displayed to the user, includes:
        information indicating that the current carbon deposit growth has exceeded the carbon deposit growth threshold and that the piston is to be damaged or is to fail if the piston continues to be used.

16. The method of claim 10, wherein taking the remedial action includes causing information to be displayed to a user,
    wherein the information, displayed to the user, includes at least one of:
        information indicating that the engine is to be shut down or derated to prevent additional carbon growth deposit,
        information indicating that the engine is to be serviced, or
        information indicating that the piston is to be serviced of replaced.

17. The method of claim 10, wherein taking the remedial action includes modifying the operation of the engine, and
    wherein modifying the operation of the engine includes at least one of:
        causing the engine to decelerate, or
        causing the engine to shut down.

18. A machine comprising:
    a piston;
    a memory configured to store carbon deposit growth information,
        the carbon deposit growth information including information identifying a previous carbon deposit growth on the piston; and
    an electronic control module configured to:
        determine a temperature of a bowl rim of the piston;
        calculate a temperature of a oil gallery of the piston based on the temperature of the bowl rim;
        determine a carbon deposit growth rate of the piston based on the temperature of the oil gallery;
        determine an amount of time between a current time and the time when the previous carbon deposit growth was calculated;
        calculate a current carbon deposit growth on the piston based on:
            the previous carbon deposit growth,
            an amount of time between a current time and a time when the previous carbon deposit growth was calculated, and
            the carbon deposit growth rate; and
        take a remedial action based on the current carbon deposit growth.

19. The machine of claim 18, wherein the electronic control module is further configured to determine whether the current carbon deposit growth exceeds a carbon deposit growth threshold,
    wherein, when the current carbon deposit growth exceeds the carbon deposit growth threshold, the piston is to start experiencing damage, and
    wherein the electronic control module is configured to take the remedial action when the current carbon deposit growth exceeds the carbon deposit growth threshold.

20. The machine of claim 18, wherein, when taking the remedial action, the electronic control module is configured to at least one of:
    modify the operation of the engine, or
    cause information to be displayed via a display of the machine,
        wherein the information, displayed via the display, includes at least one of:
            information indicating that the current carbon deposit growth has exceeded the carbon deposit growth threshold and that the piston is to be damaged or is to fail if the piston continues to be used,
            information indicating that the engine is to be shut down or derated to prevent additional carbon growth deposit,
            information indicating that the engine is to be serviced, or
            information indicating that the piston is to be serviced of replaced.

* * * * *